Figure 2:
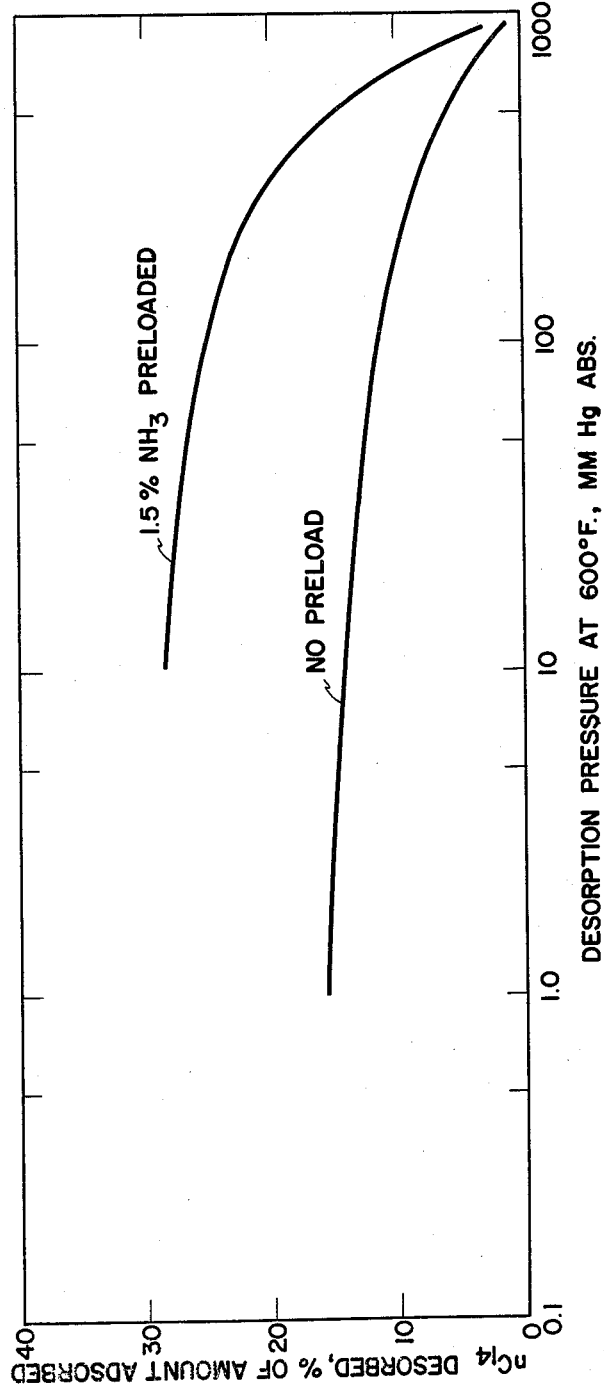

Dec. 25, 1962     W. J. ASHER ETAL     3,070,542
HYDROCARBON SEPARATION PROCESS
Filed June 24, 1960     2 Sheets-Sheet 1
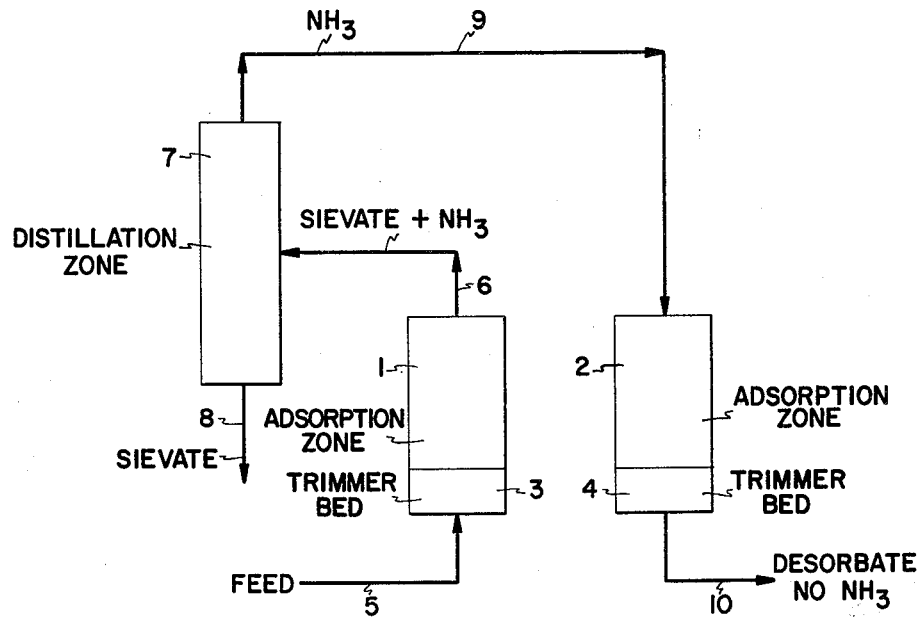
FIGURE 1
FIGURE 3
- ■ NO $NH_3$
- ● $NH_3$ PRELOAD
- ▼ $NH_3$ PRELOADED, 5.7 % $NH_3$ IN FEED
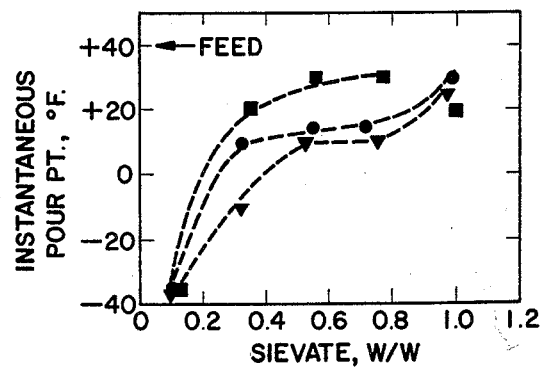
William J. Asher
William R. Epperly    Inventors
By *Richard H. Nagel* Patent Attorney Dec. 25, 1962 W. J. ASHER ETAL 3,070,542
HYDROCARBON SEPARATION PROCESS
Filed June 24, 1960 2 Sheets-Sheet 2

Inventors
William J. Asher
William R. Epperly

By Richard N. Nagel Patent Attorney

3,070,542
HYDROCARBON SEPARATION PROCESS

William J. Asher, Rahway, and William R. Epperly, Roselle, N.J., assignors to Esso Research and Engineering Company, a corporation of Delaware
Filed June 24, 1960, Ser. No. 38,526
12 Claims. (Cl. 208—310)

The present invention relates to a process for separating and segregating straight chained hydrocarbons from mixtures thereof with branch chained and/or cyclic or aromatic hydrocarbons. More particularly, the present invention relates to the adsorption of relatively heavy straight chain, normal hydrocarbons from isomeric branch chained and cyclic compounds employing a class of natural or synthetic adsorbents termed, because of their crystalline structure, molecular sieves. Still more particularly, the present invention relates to an improved process whereby the hydrocarbon is adsorbed much more rapidly than hitherto found possible on the sieve and is recovered in a manner considerably more efficient and economical than hitherto found possible.

It has been known for some time that certain zeolites both naturally-occurring and synthetic, have the property of separating normal from isomeric branch chained hydrocarbons, as well as from cyclic and aromatic admixtures. The zeolites have crystal patterns such as to form structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3 to 6 Angstrom units to 8 to 15 or more, but it is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. 2,442,191. Zeolites vary somewhat in composition, but generally contain silica, aluminum, oxygen and an alkali and/or alkaline earth element, e.g. sodium and/or calcium, magnesium, etc. Analcite has the empirical formula $NaAlSi_2O_6 \cdot H_2O$. Barrer (U.S. 2,306,610) teaches that all or part of the sodium is replaceable by calcium to yield, on dehydration, a molecular sieve having the formula

$(CaNa_2)Al_2Si_4O_{12} \cdot 2H_2O$

Black (U.S. 2,522,426) describes a synthetic molecular sieve having the formula $4CaO \cdot Al_2O_3 \cdot 4SiO_2$. A large number of other naturally-occurring zeolites having molecular sieve activity, i.e. the ability to absorb a straight-chain hydrocarbon and exclude the branch chain isomers, are described in an article "Molecular Sieve Action of Solids" appearing in Quarterly Reviews, vol. III, pp. 293 to 330 (1949), and published by the Chemical Society (London).

The separation of normal from branch chain or aromatic hydrocarbons or mixtures, either for the purpose of enriching the mixture in branch chain, cyclic or aromatic components, or for isolating and recovering of the normal isomer, has become increasingly important to industry. Thus, in the preparation of jet and diesel fuels, the presence of normal paraffins degrades the freezing point rating. On the other hand, in the manufacture of synthetic detergents such as alkyl aryl sulfonates, a straight chain nuclear alkyl substituent makes for better detergency characteristics than a branch chained substituent of the same number of carbon atoms. Many other examples may be cited.

Though it has in the past been proposed to make these separations, i.e. of normal from isomeric hydrocarbons and aromatics by molecular sieves, and though selective separations have been realized, serious problems have arisen when it was attempted to separate petroleum stocks containing normal hydrocarbons with more than 10 carbon atoms per molecule. The rate of adsorption of the normal hydrocarbons above this boiling point is very low. This has made the use of very high temperatures necessary, causing cracking and requiring uneconomically low flow rates.

The desorption of the saturated adsorbent becomes more difficult as the boiling point of the adsorbed normal hydrocarbons increases. With stocks containing normal hydrocarbons having more than ten carbon atoms per molecule, the difficulty of the desorption step is compounded by cracking. Cracking occurs more readily because of the necessity of higher desorption temperatures and longer residence times in adsorption. The cracking forms coke and polymers which are extremely difficult to remove from the adsorbent.

It has been found that the presence of small molecules of the type used as displacing mediums, such as ammonia, adsorbed in the adsorbent, decreases the strength of the adsorption bonds between the adsorbent and normal hydrocarbon concurrently adsorbed on the adsorbent. This decrease in the strength of the adsorption bond makes the movement of the adsorbed normal hydrocarbons from one point on the adsorbent to another easier. Thus, during adsorption, the normal hydrocarbon molecules move into the sieve more rapidly. The decrease in the strength of the adsorption bond also makes the desorption of the normal hydrocarbon easier.

In accordance with this invention, it has been found that the adsorption and desorption of normal hydrocarbons having more than 10 carbon atoms per molecule can be more readily accomplished by the introduction of at least some of a displacing medium such as ammonia into the feed stream during adsorption. Preferably, the adsorbent is first preloaded with the displacing medium prior to adsorption.

The amount of displacing medium introduced along with the feed is dependent on several factors. These include the molecular weight range of the normal hydrocarbon being adsorbed, the particular displacing medium, and the temperature and pressure of the adsorption and desorption operation. It is desirable, however, to introduce from 0.5 to 70 wt. percent based on weight of feed of the displacing medium, preferably from 5 to 50 wt. percent.

Briefly, after the adsorbent is preloaded with the small, tightly-held molecules, i.e. the displacing medium, the feed is introduced. If no displacing medium were incorporated in the feed, the molecules of displacing medium would be partially stripped off by the large normal hydrocarbons and pass out of the adsorption zone with the non-normal unadsorbed portion of the feed. This result makes the instant adsorption slower and incomplete; and subsequent desorption is more difficult as shown in Example 1. By introducing the displacing medium with the feed, the expulsion of the preloaded displacing medium is prevented since the displacing medium on the adsorbent approaches equilibrium with the feed. Thus, the preloaded molecules are not stripped off during adsorption, and the effect they produce is fully active throughout the entire adsorption step as well as the subsequent desorption step. Between about 0.5 and 5.0 wt. percent of the displacing medium based on weight adsorbent should still be adsorbed at the end of the adsorption step.

Desorption by displacement of the large normal molecules is preferably accomplished with the same displacing medium as is introduced with the feed.

To further illustrate the instant invention, attention is directed to FIGURE 1 which shows an inventive technique for carrying out the above-described processes. The apparatus shows the use of two adsorption zones, 1 and 2, which contain Linde 5A molecular sieves. In conjunction with each adsorption zone, trimmer zones 3 and 4, containing molecular sieves with a pore size of from 3.6 to 4.6 A., are used. The trimmer zones, 3 and 4, will not adsorb normal paraffins and olefins. In adsorption, a hydrocarbon feed containing heavy normals is fed to trimmer zone 3 through line 5. Both the trimmer zone 3 and the adsorption zone 1 have ammonia previously adsorbed thereon. As the feed passes through the trimmer 3, the partial pressure of ammonia is sharply decreased and the ammonia is desorbed from the trimmer bed and admixed with the feed. The feed, now containing ammonia which lessens the difficulty of subsequent desorption of heavy normals, enters the adsorption zone 1 wherein the normals are adsorbed. The nonadsorbed portion of the feed (sievate) and ammonia pass out of the adsorption zone 1 through line 6 to distillation tower 7. In the distillation tower 7, the sievate is removed from the system through line 8 and the ammonia recycled via line 9 to adsorption zone 2. Adsorption zone 2 has been saturated with heavy normals during a previous adsorption step and is now in position for desorption. Desorption is accomplished by means of the ammonia displacing medium which enters through line 9. The ammonia displaces the heavy normals in adsorption zone 2, and the latter flows past trimmer bed 4 and is removed from the system through line 10. The ammonia is adsorbed on the absorbent in zone 2, and any excess is adsorbed in trimmer bed 4. Hence, no ammonia leaves the system. Upon removal of all the heavy normal (desorbate) through line 10, adsorption zone 2 is again in condition for adsorption and feed is then introduced through line 10, reversing the cycle. If the pressure of adsorption is greater than the desorption pressure, there is no need to use a compressor to drive the ammonia from the distillation tower through the adsorption zone to be desorbed.

The use of the trimmer beds eliminates the need of distilling the desorbate to recover ammonia. In addition, the purging action of the feed when introduced into the trimmer bed serves to eliminate an external means for the introduction of ammonia into the feed. Hence, the trimmers increase the rate of adsorption and increase the ease of desorption by maintaining ammonia load on the 5 A. adsorbent. Without the introduction of the ammonia with the feed, the normals in the feed would partially displace the ammonia on the absorbent, thereby making desorption more difficult and resulting in an incomplete separation in adsorption.

This invention can be applied to any sieve separation involving desorption by purging with a small molecule. The only limitation is that the adsorbate molecules must be larger than the purge molecules. The trimmer bed contains sieve which will adsorb the small purge molecules but not the larger adsorbate molecules. Therefore, this invention is applicable to separations with type X as well as type A sieve.

While the invention has been described using ammonia for a desorbing medium, the invention is not intended to be so limited. The essence of the instant invention is the finding that by preloading a molecular sieve with a displacing medium, and by introducing the displacing medium along with the feed, the rate of adsorption is greatly increased and subsequent desorption is greatly eased. The particular mode of desorption described, while advantageous, is merely a preferred embodiment. For example, a strong vacuum could be used for desorbing. However, such a procedure would be costly and might necessitate the preloading of the molecular sieve before each adsorption step. On the other hand, when the same material is used as a desorbing fluid as is used for preloading and introduction of the feed, the presence of the desorbing fluid after desorption eliminates the necessity of a separate preloading step.

The operating and preferred conditions for the adsorption and desorption are shown in the following table:

TABLE A

|  | Operating | Preferred |
|---|---|---|
| Adsorption: | | |
| Temp., ° F. | 500-800 | 600-700 |
| Pressure, p.s.i.a. | 0-100 | 1-50 |
| Feed Rate, w./w./hr. | 0.1-10 | 0.25-5.0 |
| Desorption: | | |
| Temp., ° F. | 500-800 | 600-700 |
| Pressure, p.s.i.a. | 0-100 | 1-50 |
| Purge Rate, w./w./hr. | 0.01-2.0 | 0.1-1.0 |

Compounds other than ammonia can be used, in accordance with the instant invention, for increasing the rate of adsorption and easing desorption. For example, light amines such as methyl amine, halogenated compounds such as methyl and ethyl chloride and methyl fluoride, nitrated compounds such as nitromethane. Carbon dioxide may also be used. Broadly, any compound that can enter the molecular sieve and which has at least one polar bond can be used.

*Example 1*

To show the difficulty of desorption when conventional techniques are used, the following experiment was performed. A Hamburg gas oil boiling in the range of from 320 to 750° F. was introduced into an adsorption zone containing a 5 Angstrom molecular sieve at a temperature of 800° F. and a flow rate of 3 v./v./hr. This temperature and flow rate is adequate for sufficient adsorption of the normal hydrocarbons. The adsorbed normal hydrocarbons were then desorbed by ammonia displacement at 800° F. Even with this extremely vigorous desorption technique, less than 40% of the adsorbed material was removed from the molecular sieve.

*Example 2*

The advantage of the presence of ammonia during desorption was shown when treating a mixture of 10% normal $C_{14}$ and 90% methyl cyclopentane. The sieve bed was preloaded with 1.5% ammonia. The feed was introduced into the adsorption zone at a temperature of 400° F., a pressure of 10 p.s.i.g., and at a rate of 1 weight of feed per weight of sieve per hour. Following the adsorption, desorption was conducted by evacuating the sieve container while maintaining a temperature of 600° F. The experiment was then repeated with no ammonia preload. FIGURE 2 clearly illustrates the improved desorption obtained in the case of the adsorption in the presence of ammonia.

The advantages of adsorption with a displacing medium introduced with the feed are clearly shown when adsorbing wax ($C_{11}$–$C_{25}$ n-paraffins) from a Kuwait 400/700° F. middle distillate using $NH_3$ as the displacing fluid. The following three experiments illustrate this fact.

*Example 3*

The normal paraffins from middle distillate were adsorbed on fresh 5 A. molecular sieve in the vapor phase at 600° F. and 100 mm. Hg abs. by passing the middle distillate in vapor phase into an adsorption zone containing a 5 A. molecular sieve. The feed rate was 1.3 weight of distillate per weight of sieve per hour. After 0.35 weight of distillate per weight of sieve, the pour point of the effluent was +20° F. compared to +40° F. pour point of the middle distillate before contact with the sieve. The amount of wax desorbed with an excess of ammonia at 600° F. was 7.0 wt./100 wt. sieve. This case is the adsorption step of the three-step method taught by Wilchinsky et al. (U. S. 2,899,379).

*Example 4*

The molecular sieve is first preloaded with $NH_3$ at 600° F. 100 mm. Hg abs. The adsorption is then conducted as described in Example 3. The pour point of the comparable effluent is +10° F. or 10° F. improvement over Example 3. This is because of the presence of $NH_3$ during adsorption. The amount of wax desorbed with an excess of ammonia at 600° F. was 8.0 wt./100 wt.

*Example 5*

This is an illustration of the instant invention. The molecular sieve is preloaded with $NH_3$ as in Example 4, but the adsorption is conducted with the addition of 5.7 wt. percent $NH_3$ to the distillate to be passed over the sieve in otherwise the same manner. The pour point of the comparable effluent is −10° F. or an improvement of 20° F. over Example 4 and 30° F. over Example 3. This improvement over Example 4 is due to the $NH_3$ in the feed keeping a larger quantity of $NH_3$ adsorbed on the bed during the entire adsorption. The amount of wax desorbed with an excess of ammonia at 600° F. was 8.4 wt./100 wt. sieve. FIGURE 3 shows more complete results of the three examples of adsorption.

The above examples are only illustrative of the instant invention and not intended to define the scope thereof.

What is claimed is:

1. An improved process for the separation of straight chain hydrocarbons containing more than 10 carbon atoms per molecule from a feed containing said straight chain hydrocarbons in admixture with nonstraight chain hydrocarbons which comprises: passing said mixture and a displacing medium comprising a small polar molecule into a molecular sieve relatively saturated with said displacing medium; adsorbing said straight chain hydrocarbons on said molecular sieve, thereby partially desorbing said displacing medium; withdrawing a stream containing the unadsorbed portion of said mixture and said desorbed displacing medium; desorbing said straight chain hydrocarbons by introducing said displacing medium into said molecular sieve, thereby resaturating said adsorbent.

2. The process of claim 1 wherein said displacing medium is ammonia.

3. In a process for the separation of normal hydrocarbons having more than 10 carbon atoms per molecule from a feed containing said normal hydrocarbons in admixture with non-normal hydrocarbons wherein said feed is contacted with a molecular sieve adsorbent of a selected pore size in an adsorption zone, adsorbed normal hydrocarbons are subsequently desorbed from said adsorbent by a displacing medium comprising a small polar molecule, and wherein the feed is again contacted with said adsorbent in a subsequent adsorption step, the adsorption and desorption steps being repeated over a number of cycles, the improvement which comprises: mixing said feed with from about 0.5 to 70 wt. percent (based on weight of said feed) of said displacing medium prior to contacting said feed in said adsorption zone, thereby maintaining at least some of said displacing medium adsorbed on said molecular sieve adsorbent during the entire adsorption step.

4. In the process of claim 3 wherein the said displacing medium is ammonia.

5. In the process of claim 3 wherein from about 5 to 50 wt. percent (based on weight of feed) of displacing medium is mixed with the feed.

6. An improved process for the separation of straight chain hydrocarbons containing more than 10 carbon atoms per molecule from a feed containing said straight chain hydrocarbons in admixture with nonstraight chain hydrocarbons which comprises: introducing said feed into a first trimmer bed containing a 4 A. molecular sieve relatively saturated with ammonia; desorbing said ammonia from said first trimmer bed; introducing said feed mixture and said desorbed ammonia into a first adsorption zone containing a 5 A. molecular sieve relatively saturated with ammonia; adsorbing said straight chain hydrocarbons on said 5 A. molecular sieve and partially desorbing said ammonia; withdrawing a stream from said first adsorption zone containing the unadsorbed portion of said feed and ammonia; introducing said withdrawn stream into a distillation tower; separating the unadsorbed portion and the ammonia; recycling said ammonia to a second adsorption zone relatively saturated with straight chain hydrocarbons; desorbing said straight chain hydrocarbons and adsorbing said ammonia in said second adsorption zone; withdrawing a stream containing said straight chain hydrocarbons and ammonia from said second adsorption zone; introducing said straight chain hydrocarbons and ammonia into a second trimmer bed; adsorbing said ammonia on said trimmer bed; and withdrawing a stream containing straight chain hydrocarbons.

7. An improved process for the separation of waxy straight chain hydrocarbons containing more than 10 carbon atoms per molecule from feed containing straight chain hydrocarbons in admixture with nonstraight chain hydrocarbons which comprises introducing said feed mixture with about 5 to 50 wt. percent ammonia (based on the weight of feed) into an adsorption zone containing a 5 A. molecular sieve which contains ammonia, adsorbing said straight chain hydrocarbons on said 5 A. molecular sieve, and partially desorbing said ammonia, withdrawing a stream from said adsorption zone containing the unadsorbed portion of said feed and ammonia, desorbing said adsorbed straight chain hydrocarbons by contacting the molecular sieve with ammonia, withdrawing a stream containing straight chain hydrocarbons and ammonia from said adsorption zone.

8. The process of claim 7 wherein the waxy hydrocarbon feed contains hydrocarbons of about $C_{11}$–$C_{25}$ carbon atoms per molecule.

9. An improved process for the separation of straight chain hydrocarbons containing more than 10 carbon atoms per molecule from feed containing straight chain hydrocarbons in admixture with nonstraight chain hydrocarbons which comprises introducing said feed mixture with ammonia into an adsorption zone containing 5 A. molecular sieve, adsorbing said straight chain hydrocarbons on said 5 A. molecular sieve, withdrawing a stream from said adsorption zone containing the unadsorbed portion of said feed, desorbing said adsorbed straight chain hydrocarbons by contacting the molecular sieve with ammonia, withdrawing a stream containing straight chain hydrocarbons and ammonia from said adsorption zone.

10. The process of claim 9 wherein said feed contains 5 to 50 wt. percent ammonia, based on the weight of the feed.

11. The process of claim 10 wherein the hydrocarbon feed comprises a 400/700° middle distillate fraction.

12. An improved process for the separation of straight chain hydrocarbons containing more than 10 carbon atoms per molecule from feed containing straight chain hydrocarbons in admixture with nonstraight chain hydrocarbons which comprises introducing said feed mixture with ammonia into an adsorption zone containing 5 A. molecular sieve, adsorbing said straight chain hydrocarbons on said 5 A. molecular sieve, withdrawing a stream from said adsorption zone containing the unadsorbed portion of said feed, and desorbing said adsorbed straight chain hydrocarbons.

References Cited in the file of this patent

UNITED STATES PATENTS

| | | |
|---|---|---|
| 2,881,862 | Fleck et al. | Apr. 14, 1959 |
| 2,889,893 | Hess et al. | June 9, 1959 |
| 2,899,379 | Wilchinsky et al. | Aug. 11, 1959 |
| 2,930,447 | Barrer | Mar. 29, 1960 |